United States Patent
Asik (10) Patent No.: US 11,674,610 B2
(45) Date of Patent: Jun. 13, 2023

(54) VENT PLUG AND METHOD

(71) Applicant: Custom Fabricating & Supplies, Franklin, WI (US)

(72) Inventor: Brian P. Asik, Franklin, WI (US)

(73) Assignee: Custom Fabricating & Supplies, Franklin, WI (US)

( * ) Notice: Subject to any disclaimer, the term of this patent is extended or adjusted under 35 U.S.C. 154(b) by 392 days.

(21) Appl. No.: 16/936,696

(22) Filed: Jul. 23, 2020

(65) Prior Publication Data
US 2021/0010605 A1   Jan. 14, 2021

Related U.S. Application Data

(63) Continuation-in-part of application No. 29/695,168, filed on Jun. 17, 2019, now Pat. No. Des. 931,721.

(51) Int. Cl.
*F16K 15/14* (2006.01)
*C25D 13/22* (2006.01)

(52) U.S. Cl.
CPC ............ *F16K 15/148* (2013.01); *C25D 13/22* (2013.01)

(58) Field of Classification Search
CPC ................................ F16K 15/148; F16K 24/04
See application file for complete search history.

(56) References Cited

U.S. PATENT DOCUMENTS

| | | | | |
|---|---|---|---|---|
| 2,936,779 A | ‡ | 5/1960 | Kindred | A62B 9/02 137/854 |
| D212,447 S | ‡ | 10/1968 | Kaser et al. | D15/140 |
| 3,620,023 A | ‡ | 11/1971 | Schmid | E02B 13/00 137/854 |
| 3,664,879 A | ‡ | 5/1972 | Olsson | H01M 50/308 429/89 |
| 3,941,149 A | | 3/1976 | Mittleman | |
| 4,060,100 A | ‡ | 11/1977 | Miller | F16L 55/11 138/89 |

(Continued)

FOREIGN PATENT DOCUMENTS

| CA | 106496 | ‡ | 4/2004 | .......................... 23/4 |
|---|---|---|---|---|
| CN | 3315054 | ‡ | 8/2003 | ............................ 9/7 |

(Continued)

OTHER PUBLICATIONS

Royal,Green Circle Beverage Plug,Date first available Dec. 23, 2015 , [online]retrieved Jun. 8, 2021,available from https://www.amazon.com/StixToGo-Green-Circle-Beverage-Disposable/dp/B00JDLA8MM/ref=sr_1_50_sspa?dchild=1keywords=coffee+cup+stoppers&qid=1623161675&sr=8-50-spons&psc=1&spLa%E2%80%A6 (Year: 2015).‡

(Continued)

*Primary Examiner* — Kevin F Murphy
(74) *Attorney, Agent, or Firm* — Boyle Fredrickson, S.C.

(57) ABSTRACT

A vent plug and method are provide for isolating a feature of a part. The vent plug includes a plug receivable in an opening in the part to form an airtight seal between the plug and the surface of the part. A stem is receivable in a bore through the plug. The stem includes a cap and a collar. The cap has a sealing surface extending radially from an outer surface of the stem and engageable with a first surface of the plug such that sealing surface overlaps a vent hole extending through the plug. The collar extends radially from the outer surface of the stem and captures the plug between the collar and the cap.

20 Claims, 5 Drawing Sheets

(56) References Cited

U.S. PATENT DOCUMENTS

| | | | | |
|---|---|---|---|---|
| 4,231,724 A | ‡ | 11/1980 | Hope | F04B 53/1065 417/435 |
| 4,904,236 A | * | 2/1990 | Redmond | A61M 27/006 604/9 |
| 4,986,310 A | * | 1/1991 | Bailey | F16K 15/148 137/859 |
| 5,507,318 A | * | 4/1996 | Israelson | F04B 53/1065 137/854 |
| 5,753,042 A | | 5/1998 | Bauer | |
| 6,055,931 A | ‡ | 5/2000 | Sanford, Jr. | A01J 5/044 119/14.36 |
| 6,516,829 B1 | ‡ | 2/2003 | Townsend | B60T 17/004 137/512.15 |
| 6,644,510 B2 | * | 11/2003 | Kawolics | F16K 17/02 222/105 |
| 7,082,967 B2 | | 8/2006 | Sarajian et al. | |
| D596,921 S | ‡ | 7/2009 | Hageman | D8/330 |
| 8,851,053 B2 | * | 10/2014 | Shudo | F02D 19/02 123/527 |
| D921,208 S | ‡ | 6/2021 | Kwon | D24/193 |
| 2010/0025614 A1 | ‡ | 2/2010 | Cai | F04B 43/025 251/324 |
| 2014/0141292 A1 | ‡ | 5/2014 | Lee | H01M 50/325 429/54 |
| 2021/0010605 A1 | ‡ | 1/2021 | Asik | F16K 15/148 |

FOREIGN PATENT DOCUMENTS

| | | | | |
|---|---|---|---|---|
| CN | 301957768 | ‡ | 11/2011 | 8/99 |
| CN | 302693031 | ‡ | 7/2013 | 8/99 |
| CN | 302893438 | ‡ | 1/2014 | 8/99 |
| EP | 1609533 | | 3/2009 | |
| JP | H0932943 A | | 2/1997 | |
| JP | H10299922 A | | 11/1998 | |
| JP | D1654720 | ‡ | 5/2019 | 7/1 |
| KR | 300857516.0000 | ‡ | 10/2015 | 7/3 |

OTHER PUBLICATIONS

TapeCase Store, Silicone Step Plugs, Date first available Feb. 26, 2013, [online]retrieved Jun. 8, 2021,available from https://www.amazon.com/TapeCase-Silicone-0-236in-0-354in-0-631in/dp/B00BLPF8GY/ref=sr_1_7?dchild=1&keywords=silicon+step+plug&qid=1623166014&sr=8-7 (Year: 2013).‡

Hyuan, Tech Universal Silicone Cleaning Plugs+Caps, Date first available Sep. 1, 2020, [online]retrieved Jun. 8, 2021,available from https://www.amazon.com/dp/B08H4YV3YF/ref=sspa_dk_detail_3?psc=1&pd_rd_i=B08H4YV3YF&pd_rd_w=A4xxU&pf_rd_p=5d846283-ed3e-4512-a744-a30f97c5d738&pd_rd_wg=NZgBw (Year: 2020).‡

\* cited by examiner
‡ imported from a related application

VENT PLUG AND METHOD

CROSS-REFERENCE TO RELATED APPLICATION

This application is a continuation-in-part of U.S. application Ser. No. 29/695,168, filed Jun. 17, 2019.

FIELD OF THE INVENTION

This invention relates generally to the electrocoating of parts, and in particular, to a vent plug and method for preventing certain areas of a part, such as internal surfaces of the part, threads or grounding surfaces, from being coated with paint/coating particles when the part is immersed in an aqueous solution during an electrocoating process and for venting air pressure within the part which may be accumulated therein during a curing process.

BACKGROUND AND SUMMARY OF THE INVENTION

As is known, electrocoating is a process wherein electrical current is used to deposit a paint/coating on surfaces of a part. More specifically, in the electrocoating process, a conductive part is immersed in an aqueous solution that includes particles of the paint/coating to be deposited on the surface of the part. A voltage is applied to the aqueous solution such that particles of the paint/coating in the aqueous solution are electrically charged. The electrically charge on the particles causes the particles to be deposited out of an aqueous solution to coat or condense on the surfaces of the part. The thickness of the paint/coating on the surfaces of the part may be controlled by regulating the magnitude of the voltage applied to the aqueous solution. After the paint/coating particles are deposited on the surfaces of part, the part is removed from the aqueous solution and heated in an oven to cure the paint/coating thereon.

It can be understood that it is often desirable to prevent certain surfaces of the part from being coated with the paint/coating. As such, these surfaces of the part must be masked to prevent the desired surfaces of the part from being exposed to particles of the paint/coating in the aqueous solution. It can be appreciated that the mask must be impermeable to the aqueous solution to prevent the aqueous solution from flowing past the mask and contacting the surfaces of the part intend to be free of the paint/coating. While the process of masking the external surfaces of a part are straightforward, masking the internal surfaces of the part can be difficult. For example, masking tape may be used on the external surfaces of the part to prevent the desired surfaces of the part from being exposed to particles of the paint/coating in the aqueous solution. However, accurately affixing masking tape to the internal surfaces of the part is not always feasible. Consequently, various products have been developed to isolate the internal surfaces of a part from the aqueous solution.

In order to isolate the internal surfaces of the part from the aqueous solution, various types of plugs have been developed. For example, rubber plugs may be inserted into openings of the part to isolate the internal surfaces of the part from the external environment by providing an air/fluid tight seal. The rubber plugs prevent the aqueous solution from coming into contact with the internal surfaces of the part when the part is immersed in an aqueous solution. However, during the curing process, the heat causes the air pressure within the portion of the part isolated by the rubber plug[s] to build. Once the air pressure builds up to a sufficient level, the rubber plug[s] may be blown off the part.

In order to overcome the limitations associated with conventional rubber plugs, mechanical fasteners have been used to prevent the rubber plugs from blowing off the part during the curing process. However, it has been found that the mechanical pressure on the rubber plugs may cut the rubber plugs, thereby causing the rubber plugs to fail during the electrocoating process. More specifically, during the immersion of the part in the aqueous solution, the aqueous solution can flow through the cuts in the rubber plugs allow and coat the surfaces of the part intended to be free of the paint/coating. Further, mechanical fasteners are expensive to fabricate and increase the labor time associated with the electrocoating process.

Alternatively, specialized masks have been fabricated that correspond in size and shape of interior portion of the part that is intended to be free of the paint/coating. These specialized masks remove air from the interior portion of the part, thereby eliminating the possibility specialized masks will be blown off the part during the curing process. However, specialize masks are expensive to fabricate and are difficult to insert and remove from the part.

In view of the foregoing, it is a primary object and feature of the present invention to provide a vent plug for isolating certain areas of a part, such as internal surfaces, threads or grounding surfaces, from being coated with paint/coating particles when the part is immersed in an aqueous solution during an electrocoating process and for venting air pressure within the part which may be accumulated therein during a curing process.

It is a further object and feature of the present invention to provide a vent plug for isolating certain areas of a part from an aqueous solution during an electrocoating process which remains on the part during the curing process conducted thereafter.

It is a still further object and feature of the present invention to provide a vent plug for isolating certain areas of a part from an aqueous solution during an electrocoating process which simple and inexpensive to manufacture.

In accordance with the present invention, a vent plug is provided for isolating a feature of a part having a surface defining an opening in the part. The vent plug includes a plug having a first surface and a second surface spaced by a thickness. The plug has a radially outer surface engageable with the surface of the part to form an airtight seal therebetween. The plug also includes a bore having a diameter extending between the first and second surfaces and a vent hole extending between the first and second surfaces. A stem extends through the bore along an axis and has a first end, a second end and outer surface. A cap is interconnected to the stem. The cap includes a sealing surface extending radially from the outer surface of the stem and in engagement with the first surface of the plug. The sealing surface overlaps the vent hole in the plug. A collar extends radially from the outer surface of the stem at a location spaced from the sealing surface of the stem by a distance. The distance is generally equal to the thickness between the first and second surfaces of the plug. The plug is captured between the cap and the collar.

The cap may be interconnected to the first end of the stem and the first surface of the plug includes a first portion. The bore and the vent hole intersect the first portion of the first surface of the plug. The thickness of the plug is a first thickness. The first thickness is the distance between the first portion of the first surface and the second surface of the plug. The first surface of the plug may also include a second portion extending radially outward from the first portion of the first surface of the plug. The second portion of the first surface and the second surface of the plug are spaced by a second thickness less than the first thickness.

The plug may include a sidewall extending about an outer periphery of the plug. The sidewall is defined by the outer surface of the plug and an inner surface projecting from the first surface of the plug. The sidewall includes a terminal end axially spaced from the first surface of the plug. The sidewall may include a flange extending radially outward from the terminal end.

In accordance with a further aspect of the present invention, a vent plug is provided for isolating a feature of a part having a surface defining an opening in the part. The vent plug includes a plug receivable in the opening to form an airtight seal between the plug and the surface of the part. The plug includes first and second surfaces spaced by a thickness, a bore having a diameter and extending between the first and second surfaces, and a vent hole extending between the first and second surfaces. A stem is receivable in the bore along an axis and includes a cap and a collar. The cap has a sealing surface extending radially from an outer surface of the stem and in engagement with the first surface of the plug such that sealing surface overlaps the vent hole in the plug with the stem received in the bore. A collar extends radially from the outer surface of the stem at a location spaced from the sealing surface of the stem by a distance. The collar is configured to capture the plug between the collar and the cap. The distance is generally equal to the thickness between the first and second surfaces of the plug.

The cap may be interconnected to a first end of the stem. The first surface of the plug includes a first portion. The bore and the vent hole intersect the first portion of the first surface of the plug. The thickness of the plug may be a first thickness. The first thickness is the distance between the first portion of the first surface and the second surface of the plug. The first surface of the plug may also include a second portion extending radially outward from the first portion of the first surface of the plug. The second portion of the first surface and the second surface of the plug are spaced by a second thickness less than the first thickness.

The plug may include a sidewall extending about an outer periphery. The sidewall includes an outer surface engageable with the surface of the plug and an inner surface projecting from the first surface of the plug. The sidewall includes a terminal end axially spaced from the first surface of the plug. The sidewall includes a flange extending radially outward from the terminal end.

In accordance with a still further aspect of the present invention, a method is provided for isolating a feature of a part having surface defining an opening in the part. The method includes the step of inserting a plug into the opening in the part such that an airtight seal is formed between the plug and the surface of the part. The plug includes first and second surfaces spaced by a thickness, a bore having a diameter and extending between the first and second surfaces, and a vent hole extending between the first and second surfaces. A stem is inserted through the bore in the plug. The stem includes a cap having a sealing surface extending radially from an outer surface of the stem and a collar extending radially from the outer surface of the stem at a location spaced from the sealing surface of the stem by a distance. The plug is captured between the collar and the cap.

The step of inserting the stem through the bore in the plug may include the step of positioning the first surface of the plug such that sealing surface overlaps the vent hole in the plug. The distance between the collar and the sealing surface of the stem is generally equal to the thickness between the first and second surfaces of the plug. The cap may be interconnected to a first end of the stem. The first surface of the plug includes a first portion. The bore and the vent hole intersect the first portion of the first surface of the plug. The thickness of the plug is a first thickness. The first thickness is the distance between the first portion of the first surface and the second surface of the plug. The first surface of the plug includes a second portion extending radially outward from the first portion of the first surface of the plug. The second portion of the first surface and the second surface of the plug are spaced by a second thickness less than the first thickness.

The plug may include a sidewall extending about an outer periphery. The sidewall includes an outer surface engageable with the surface of the plug and an inner surface projecting from the first surface of the plug. The sidewall includes a terminal end axially spaced from the first surface of the plug. The sidewall includes a flange extending radially outward from the terminal end.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Referring to FIGS. 1-10, a vent plug in accordance with the present invention is generally designated by the reference numeral 10. As hereinafter described, vent plug 10 is intended to prevent certain surfaces of a part from being coated with a paint/coating particles during a finishing process, e.g., an electrocoating process when the part is immersed in an aqueous solution and to vent air pressure within the part which may accumulate therein during the curing process. Vent plug 10 includes plug 12 fabricated from a resilient material such silicone rubber or the like. As best seen in FIGS. 1 and 6-9, plug 12 is defined by a first, generally circular surface 14 and a second generally circular surface 16. First surface 14 includes a first portion 18 having a generally circular configuration with a diameter D1 and a second recessed portion 20 extending radially outward from first portion 18. Outer edge 22 of first portion 18 is interconnected to inner edge 24 of second portion 20 by angled face 26. First portion 18 of first surface 14 is spaced from second surface 16 by a first thickness T1. Second portion 20 of first surface 14 is spaced from second surface by a second thickness T2 which is less than first thickness T1. Second surface 16 of plug 12 is generally flat and includes a radially outer edge 28.

Figures 4, 5, 6:
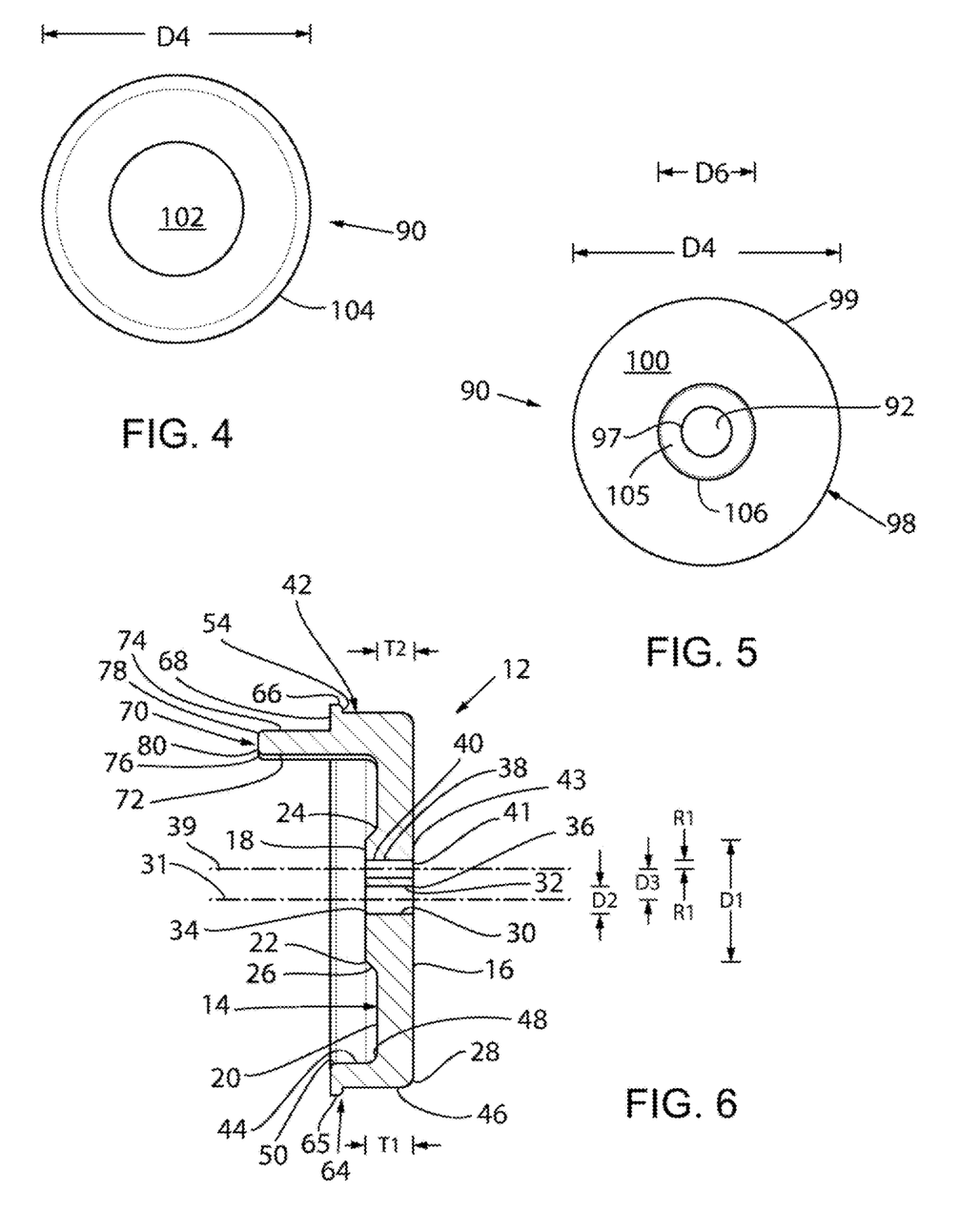
FIG. 4 is a top plan view of the stem of FIG. 2.
FIG. 5 is a bottom plan view of the stem of FIG. 2.
FIG. 6 is a cross-sectional view of a plug of the vent plug of the present invention.
Figure 7:
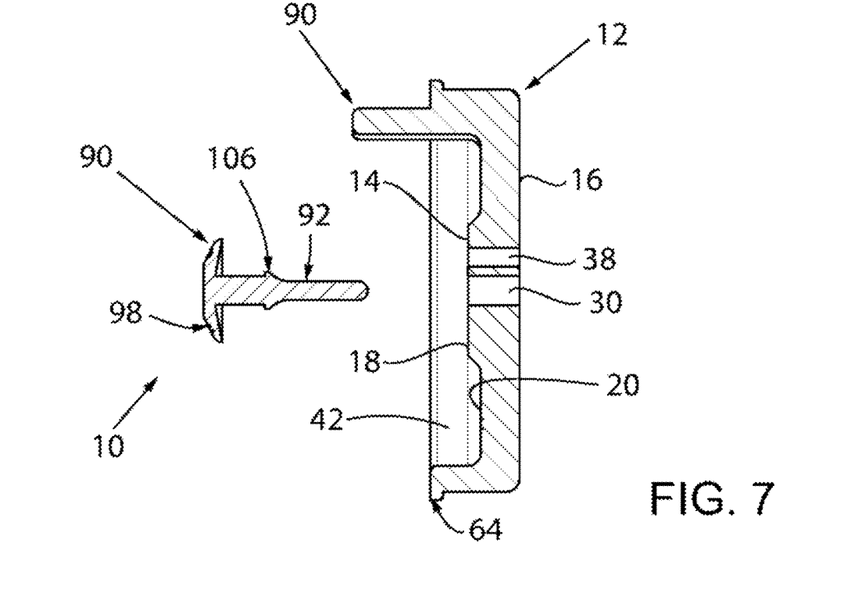
FIG. 7 is an exploded cross-sectional view of the stem of FIG. 2 being inserted into the plug of FIG. 6.
Figure 8:
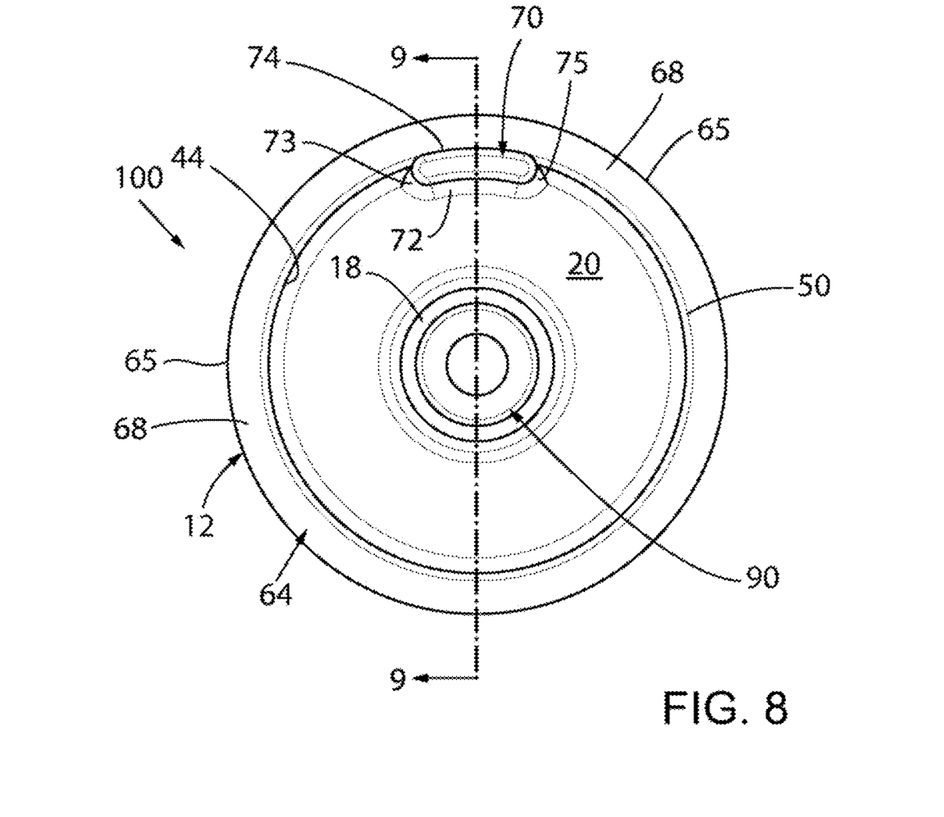
FIG. 8 is a top plan view of the vent plug of the present invention.

Plug 12 further includes bore 30 extends along axis 31 intersecting the centers of first portion 18 of first surface 14 and of second surface 16. Bore 30 has a diameter D2 and is defined by a generally cylindrical surface 32. Surface 32 has a first end intersecting first portion 18 of first surface 14 at circular edge 34 and a second end intersecting second surface 16 at circular edge 36. Vent hole 38 extends along axis 39 intersecting first portion 18 of first surface 14 and second surface 16. Axis 39 of vent hole 38 generally parallel to and radially spaced from the axis of bore 30 by a distance D3. Vent hole 38 is defined by a generally cylindrical surface 41 having a first end intersecting first portion 18 of first surface 14 at circular edge 40 and a second end intersecting second surface 16 at circular edge 43. Vent hole 38 has a radius R1.

Plug 12 further includes outer wall 42 extending about the outer periphery thereof. Outer wall 42 is defined by inner and outer surfaces 44 and 46, respectively. Inner surface 44 extends from outer periphery 48 of second portion 20 of first surface 14 and is generally perpendicular to second portion 20 of first surface 14. Inner surface 44 terminates at terminal edge 50 which is axially spaced from outer periphery 48 of second portion 20 of first surface 14. Outer surface 46 of outer wall 42 of plug 12 extends from outer edge 28 of second surface 16 and is generally perpendicular to second surface 16. Outer surface 46 of outer wall 42 terminates at terminal edge 54 which is axially spaced from outer edge 28 of second surface 16.

Flange 64 projects radially outwardly from outer wall 42 of plug 12 and terminates at terminal end 65. Flange 64 is defined by first surface 66 extending radially outward from terminal edge 54 of outer surface 46 and second surface 68 extending radially outward from terminal edge 50 of inner surface 44 of outer wall 42. First and second surfaces 66 and 68, respectively, of flange 64 are generally parallel to each other and are interconnected by terminal end 65.

Plug 12 further includes tab 70 projecting from second portion 20 of first surface 14. As hereinafter described, it is intended for tab 70 to facilitate the removal of plug 12 from opening 56 in part 58. Tab 70 is defined by inner and outer surfaces 72 and 74, respectively, interconnected by first and second sides 73 and 75, respectively. Inner surface 72 extends from second portion 20 of first surface 14 and is generally perpendicular to second portion 20 of first surface 14. Inner surface 72 of tab 70 is spaced from inner surface 44 of outer wall 42 and terminates at terminal edge 76 which is axially spaced from second portion 20 of first surface 14. Outer surface 74 of tab 70 extends from terminal edge 50 of inner surface 44 of outer wall 42 and is generally parallel to inner surface 72 of tab 70. Outer surface 74 of tab 70 terminates at terminal edge 78 which is interconnected to terminal edge 76 of tab 70 by terminal end 80.

Figure 1:
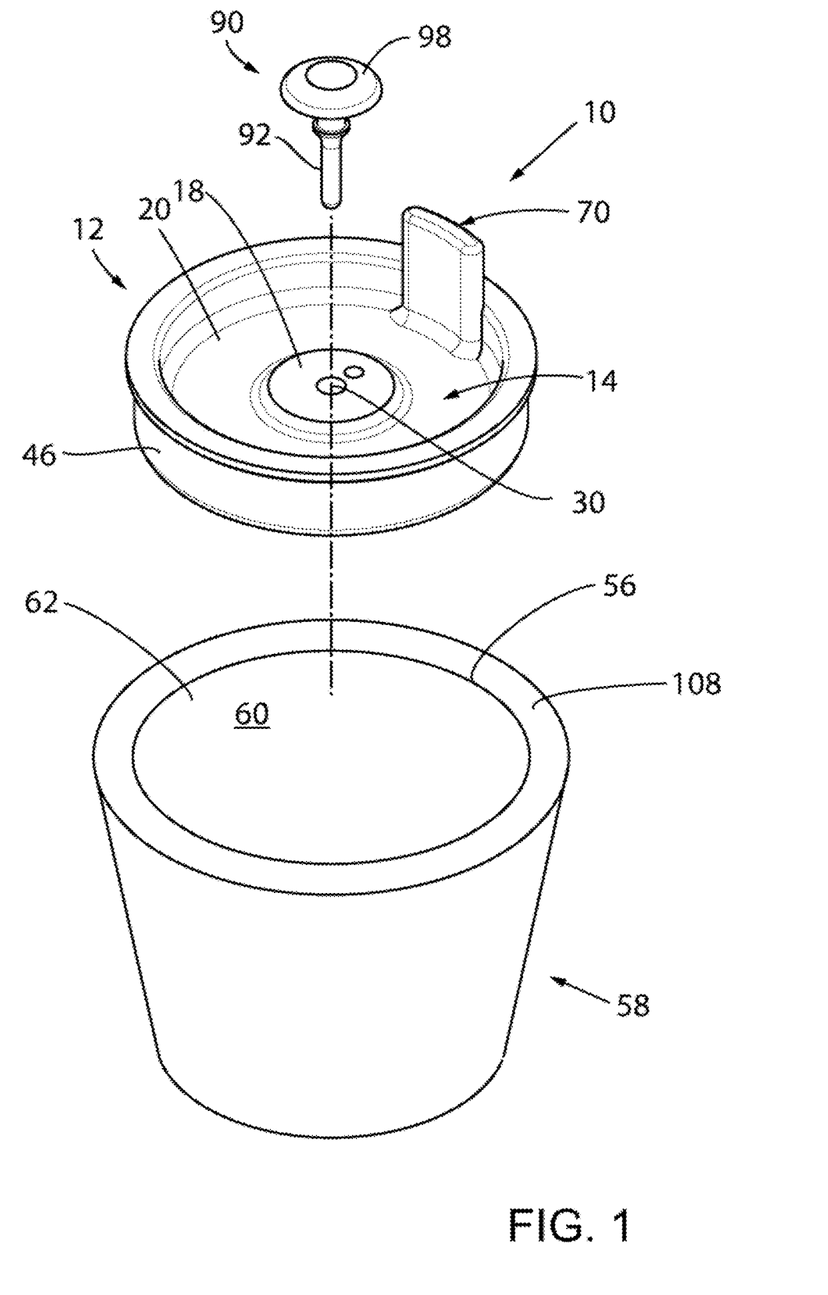
FIG. 1 is an exploded, isometric view of a vent plug in accordance with the present invention showing the vent plug being inserted into a part.

As hereinafter described, it is intended for plug 12 to prevent certain areas of part 58, e.g. a desired surface[s] such as surface 62 within interior 60 of part 58, from being exposed to particles of a paint/coating when part 58 is submerged in an aqueous solution during an electrocoating process, FIGS. 1 and 9. As such, it is contemplated for outer surface 46 of outer wall 42 to have a configuration corresponding to a configuration of opening 56 in part 58. In the depicted embodiment, outer surface 46 of outer wall 42 has a generally circular configuration having a diameter generally equal to the diameter of opening 56 in part 58 such that, with plug 12 received in opening 56 in part 58, outer surface 46 of outer wall 42 forms an airtight and fluid tight seal against surface 62 within interior 60 of part 58. However, it can be appreciated that the configuration of outer surface 46 of outer wall 42 may be customized to correspond to the configuration of opening 56 in part 58. Therefore, it can be understood the configuration of outer surface 46 of outer wall 42 may be varied without deviating from the scope of the present invention.

Vent plug 10 further includes stem 90 removably receivable in bore 30. Referring to FIGS. 2-5, stem 90 includes shaft 92 extending along an axis and having first and second opposite ends 94 and 96, respectively, and outer surface 97. Cap 98 is interconnected to first end 94 of stem 90 and includes a generally flat sealing surface 100 extending radially from outer surface 97 and terminating at a radially outer edge 99. It is intended for sealing surface 100 to have a generally circular configuration and a diameter D4: 1) greater than the sum of distance D3 between axis 39 of vent bore and axis 31 of bore 30 and radius R1 of vent hole 38; and 2) less than diameter D1 of first portion 18 of first surface 14 of plug 12, for reasons hereinafter described. Cap 98 further includes a convex engagement surface 102 having an outer periphery 104 interconnected to outer edge 99 of sealing surface 100.

Figure 2:
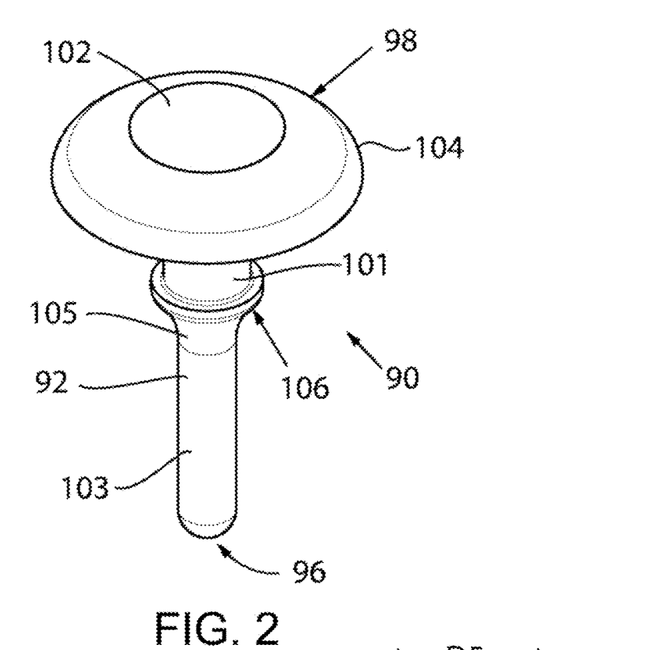
FIG. 2 is an isometric view of a stem of the vent plug of the present invention.
Figure 3:
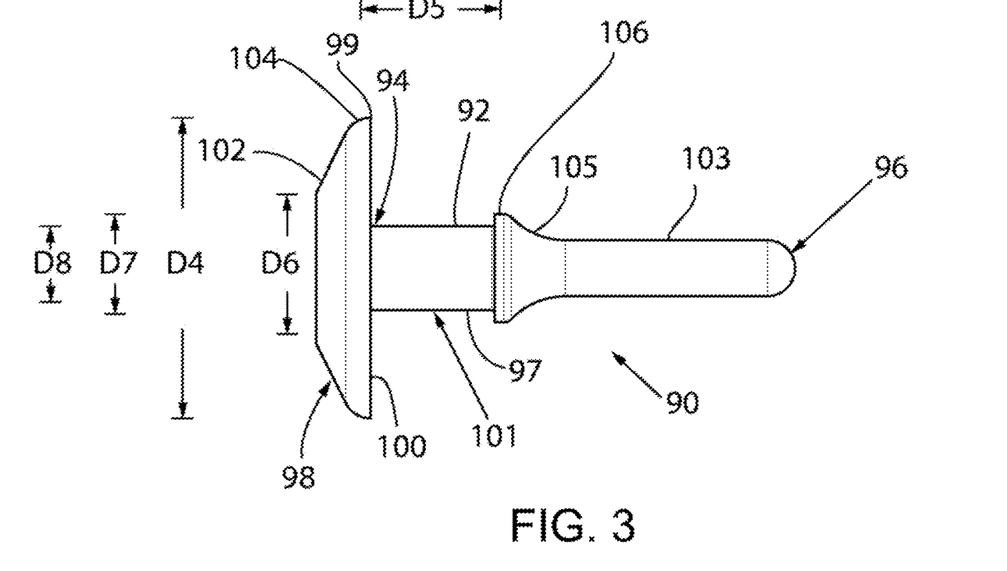
FIG. 3 is a side elevational view of the stem of FIG. 2.

Stem 90 of valve plug 10 further includes collar 106 extending about outer surface 97 of shaft 92 at a location between first and second ends 94 and 96, respectively, of shaft 92. It is intended for collar 106 to be spaced from sealing surface 100 of cap 98 by a distance D5 generally equal to thickness T1 between first portion 18 of first surface 14 and second surface 16. First portion 101 of shaft 92 is defined between cap 98 and collar 106 and has a diameter D7 generally equal to the diameter D2 of bore 30 in plug 12. In addition, collar 106 has an outer diameter D6 greater than the diameter D2 of bore 30, as hereinafter described. To facilitate insertion of shaft 92 of stem 90 into bore 30 in plug 12, it is contemplated for shaft 92 to have a reduced diameter portion 103 extending from second end 96 of shaft 92 toward collar 106 and having a diameter D8 less than the diameter D2 of bore 30. Concave transition surface 105 interconnects reduced diameter portion 103 of shaft 92 and collar 106 and has a gradually increasing diameter so as to facilitate the insertion of collar 106 into bore 30, as hereinafter described.

Figure 9:
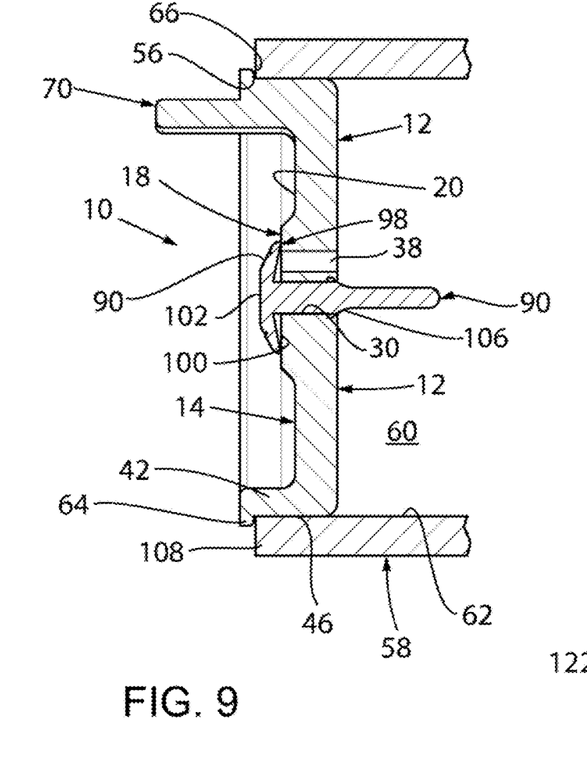
FIG. 9 is a cross-sectional view of the vent plug of the present invention taken along line 9-9 of FIG. 8.

In operation, plug 12 is inserted into in opening 56 in part 58 such that outer surface 46 of outer wall 42 engages and forms an airtight and fluid tight seal against surface 62 within interior 60 of part 58, FIGS. 1 and 7-9. Plug 12 continues to be inserted into in opening 56 in part 58 until first surface 66 of flange 64 engages outer surface 108 of part 58. FIG. 9. Thereafter, shaft 92 of stem 90 is inserted into bore 30. A user may engage/press on engagement surface 102 of cap 98 to urge shaft 92 of stem 90 into bore 30 until stem 90 is fully inserted into bore 30 such that sealing surface 100 of cap 98 engages first portion 18 of first portion 14 of plug 12. It can be appreciated that concave transition surface 105 of shaft 92 coupled with the resiliency of the material from which plug 12 is formed allows for collar 106 to pass through bore 30.

With shaft 92 of stem 90 fully inserted into bore 30, as heretofore described, it can be appreciated that first portion 18 of first surface 14 and second surface 16 of plug 12 is disposed between sealing surface 100 of cap 98 and collar 106 extending about outer surface 97 of shaft 92. Further, with stem 90 fully inserted into bore 30, the diameter D4 of sealing surface 100 of cap is of sufficient dimension so as to overlap vent hole 38 through plug 12. In addition, the resiliency of the material from which plug 12 is formed allows for surface 32 in plug 12 defining bore 30 to form an airtight and fluid tight seal with outer surface 97 of shaft 92.

With vent plug 10 inserted into opening 56 in part 58, vent plug 10 isolates certain areas of part 58, e.g. a desired surface[s] such as surface 62 within interior 60 of part 58, from being exposed to particles of a paint/coating when part 58 is submerged in an aqueous solution during an electrocoating process. More specifically, the airtight and fluid tight seal between outer surface 46 of outer wall 42 of plug 12 and surface 62 within interior 60 of part 58 prevents the aqueous solution from entering interior 60 of part 58 therethrough. Further, the fluid pressure exerted on cap 98 by the aqueous solution in which part 58 is submerged urges sealing surface 100 of cap 98 against first portion 18 of first surface 14, thereby preventing the aqueous solution from flowing past cap 98 into vent hole 38 in plug 12.

After the electrocoating process is complete, part 58, with vent plug 10 in opening 56 thereof, is removed from the aqueous solution, and positioned within an oven or the like to heat part 58 and cure the paint/coating thereon. As part 58 is heated, the heat causes the air pressure within interior 60 of part 58 isolated by vent plug 10 to increase As noted above, collar 106 has a diameter D6 greater than the diameter D2 of bore 30. As the air pressure within interior 60, and hence within vent hole 38 in plug 12, builds, collar 106 retains shaft 90 of stem 92 within bore 30 and sealing surface 100 of cap 98 against first portion 18 of first surface 14 of plug 12. Once the air pressure builds up to a sufficient level, the air pressure on collar 106 and in vent hole 38 causes collar 106 to compress plug 12 and/or sealing surface 100 of cap 98 to be urged away from first portion 18 of first surface 14 of plug 12, thereby allowing the air pressure with interior 60 of part 58 to be vented through vent hole 38 and pass between sealing surface 100 of cap 98 and first portion 18 of first surface 14 of plug 12. It can be appreciated that the structure of vent plug 12 allows for certain areas of a part, like internal surfaces, threads or grounding surfaces, to be isolated from paint/coating particles when part 58 is immersed in an aqueous solution during an electrocoating process and to vent air pressure within part 58 which may accumulate therein during the curing process.

After the curing process complete and the paint/coating is dried and hardened on part 58, part 58 is removed from the oven or the like. Thereafter, vent plug 10 may be removed from removed from opening 56 in part 58. More specifically, shaft 92 of stem 90 may be withdrawn from bore 30 in plug 12. Tab 70 may be grasped to facilitate removal of plug 12 from opening 56 in part 58. Vent plug 10 may then be used, as heretofore described, in a subsequent part 58 to prevent certain surfaces of such part from being coated with a paint/coating particles during the electrocoating process when the part is immersed in an aqueous solution and to vent air pressure within such part which may accumulate therein during the curing process.

Figure 10:
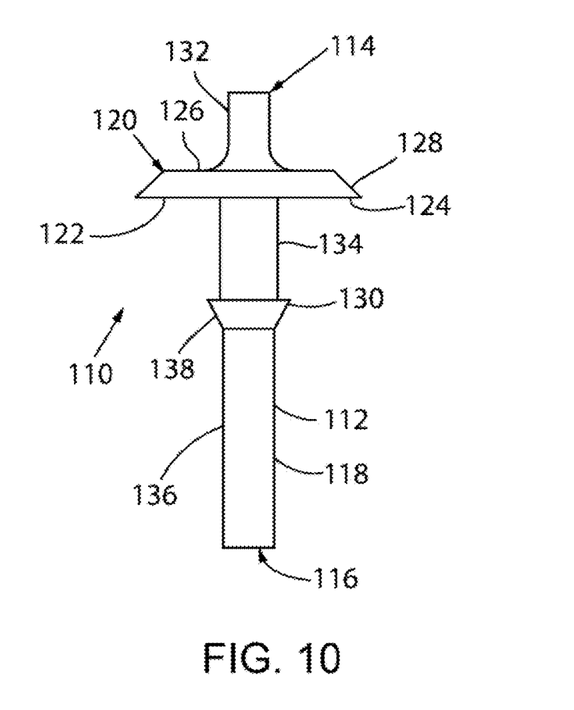
FIG. 10 is a side elevational view of an alternate configuration of the stem of FIG. 2.

Referring to FIG. 10, an alternate embodiment of a stem for the vent plug of the present invention is generally designated by the reference numeral 110. Stem 110 includes shaft 112 extending along an axis and having first and second opposite ends 114 and 116, respectively, and outer surface 118. Sealing flange 120 extends radially from outer surface 118 of shaft 12 at a location spaced from first end 114 of shaft 112. Sealing flange 120 includes a generally flat sealing surface 122 extending radially from outer surface 118 and terminating at a radially outer edge 124. It is intended for sealing surface 122 to have a generally circular configuration and a diameter D4: greater than the sum of distance D3 between axis 39 of vent bore and axis 31 of bore 30 and radius R1 of vent hole 38; and 2) less than diameter D1 of first portion 18 of first surface 14 of plug 12, for reasons hereinafter described. Sealing flange 120 further includes a convex engagement surface 126 having an outer periphery 128 interconnected to outer edge 124 of sealing surface 122.

Stem 110 of valve plug 10 further includes collar 130 extending about outer surface 118 of shaft 112 at a location between sealing flange 120 and second end 116 of shaft 112. It is intended for collar 130 to be spaced from sealing surface 122 of sealing flange 120 by a distance D5 generally equal to thickness T1 between first portion 18 of first surface 14 and second surface 16 of plug 12. In addition, collar 130 has an outer diameter D7 greater than the diameter D2 of bore 30, as hereinafter described. First portion 134 of shaft 112 is defined between sealing flange 120 and collar 130 and has a diameter D7 generally equal to the diameter D2 of bore 30 in plug 12. In addition, collar 130 has an outer diameter D6 greater than the diameter D2 of bore 30, as hereinafter described. To facilitate insertion of shaft 112 of stem 110 into bore 30 through plug 12, it is contemplated for shaft 112 to have a reduced diameter portion 136 extending from second end 116 of shaft 112 toward collar 130 and having a diameter D8 less than the diameter D2 of bore 30. Concave transition surface 138 interconnects reduced diameter portion 1136 of shaft 112 and collar 130 and has a gradually increasing diameter so as to facilitate the insertion of collar 130 into bore 30, as hereinafter described.

In operation, once plug 12 is inserted into in opening 56 in part 58 as heretofore described, shaft 112 of stem 110 is inserted into bore 30. A user may engage/press on engagement surface 126 of sealing flange 120 to urge shaft 112 of stem 110 into bore 30 until stem 110 is fully inserted into bore 30 such that sealing surface 122 of sealing flange 120 engages first portion 18 of first surface 14 of plug 12. It can be appreciated that concave transition surface 138 of shaft 112 coupled with the resiliency of the material from which plug 12 is formed allow for collar 130 to pass through bore 30.

With shaft 112 of stem 110 fully inserted into bore 30, as heretofore described, it can be appreciated that first portion 18 of first surface 14 and second surface 16 of plug 12 are disposed between sealing surface 122 of sealing flange 120 and collar 130 extending about outer surface 118 of shaft 112. Further, with stem 110 fully inserted into bore 30, the diameter D4 of sealing surface 122 of sealing flange 120 is of sufficient dimension so as to overlap vent hole 38 through plug 12. In addition, the resiliency of the material from which plug 12 is formed allows for surface 32 in plug 12 defining bore 30 to form an airtight and fluid tight seal with outer surface 118 of shaft 112.

With vent plug 10 inserted into opening 56 in part 58, vent plug 10 isolates certain areas of part 58, e.g. a desired surface[s] such as surface 62 within interior 60 of part 58, from being exposed to particles of a paint/coating when part 58 is submerged in an aqueous solution during an electrocoating process. More specifically, the airtight and fluid tight seal between outer surface 46 of outer wall 42 of plug 12 and surface 62 within interior 60 of part 58 prevents the aqueous solution from entering interior 60 of part 58 therethrough. Further, the fluid pressure exerted on sealing flange 120 by the aqueous solution in which part 58 is submerged urges sealing surface 122 of sealing flange 120 against first portion 18 of first surface 14 of plug 12, thereby preventing the aqueous solution from flowing past sealing flange 120 into vent hole 38 in plug 12.

After the electrocoating process is complete, part 58, with vent plug 10 in opening 56 thereof, is removed from the aqueous solution, and positioned within an oven or the like to heat part 58 and cure the paint/coating thereon. As part 58 is heated, the heat causes the air pressure within interior 60 of part 58 isolated by vent plug 10 to increase. As noted above, collar 130 has a diameter D6 greater than the diameter D2 of bore 30. As the air pressure within interior 60, and hence within vent hole 38 in plug 12, builds, collar 130 retains shaft 112 of stem 110 within bore 30 and sealing surface 122 of sealing flange 120 against first portion 18 of first surface 14 of plug 12.

Once the air pressure builds up to a sufficient level, the air pressure on collar 130 and in vent hole 38 causes collar 130 to compress plug 12 and/or sealing surface 122 of sealing flange 120 to be urged away from first portion 18 of first surface 14 of plug 12, thereby allowing the air pressure with interior 60 of part 58 to be vented through vent hole 38 and pass between sealing surface 122 of sealing flange 120 and first portion 18 of first surface 14 of plug 12. It can be appreciated that the structure of vent plug 10 allows for certain areas of a part, e.g. the internal surfaces, threads or grounding surfaces, to be isolated from paint/coating particles when part 58 is immersed in an aqueous solution during an electrocoating process and to vent air pressure within part 58 which may accumulate therein during the curing process.

After the curing process complete and the paint/coating is dried and hardened on part 58, part 58 is removed from the oven or the like. Thereafter, vent plug 10 may be removed from removed from opening 56 in part 58. More specifically, shaft 112 of stem 120 may be withdrawn from bore 30 in plug 12. Portion 132 of shaft 112 between sealing flange 120 and first end 114 thereof may be grasped to facilitate removal of stem 120 from bore 30 in plug 12. Similarly, tab 70 of plug 12 may be grasped to facilitate removal of plug 12 from opening 56 in part 58. Vent plug 10 may then be used, as heretofore described, in a subsequent part 58 to prevent certain surfaces of such part from being coated with a paint/coating particles during the electrocoating process when the part is immersed in an aqueous solution and to vent air pressure within such part which may accumulate therein during the curing process.

Various modes of carrying out the invention are contemplated as being within the scope of the following claims particularly pointing out and distinctly claiming the subject matter, which is regarded as the invention.

I claim:

1. A vent plug for isolating a feature of a part having a surface defining an opening in the part, the vent plug comprising:
   a plug having a first surface and a second surface spaced by a thickness and a radially outer surface engageable with the surface of the part to form an airtight seal therebetween, the plug including a bore having a diameter and extending between the first and second surfaces and a vent hole extending between the first and second surfaces;
   a stem extending through the bore along an axis and having a first end, a second end and outer surface;
   a cap interconnected to the stem, the cap including a sealing surface extending radially from the outer surface of the stem and overlapping the vent hole in the plug; and
   a collar extending radially from the outer surface of the stem at a location spaced from the sealing surface of the stem by a distance, the distance being generally equal to the thickness between the first and second surfaces of the plug;
wherein;
   the plug is captured between the cap and the collar; and
   the collar is movable between a first position wherein the sealing surface is in engagement with the first surface of the plug so as to isolate an interior of the part and a second position wherein the collar compresses the second surface of the plug and the sealing surface is spaced from the first surface of the plug in response to the air pressure within the interior of the part.

2. The vent plug of claim 1 wherein the cap is interconnected to the first end of the stem.

3. The vent plug of claim 1 wherein the first surface of the plug includes a first portion, the bore and the vent hole intersecting the first portion of the first surface of the plug.

4. The vent plug of claim 3 wherein the thickness of the plug is a first thickness, the first thickness being the distance between the first portion of the first surface and the second surface of the plug.

5. The vent plug of claim 4 wherein the first surface of the plug includes a second portion extending radially outward from the first portion of the first surface of the plug, the second portion of the first surface and the second surface of the plug spaced by a second thickness less than the first thickness.

6. The vent plug of claim 1 wherein the plug includes a sidewall extending about an outer periphery of the plug, the sidewall defined by the outer surface of the plug and an inner surface projecting from the first surface of the plug.

7. The vent plug of claim 6 wherein:
   the sidewall includes a terminal end axially spaced from the first surface of the plug; and
   the sidewall including a flange extending radially outward from the terminal end.

8. A vent plug for isolating a feature of a part having a surface defining an opening in the part, the vent plug comprising:
   a plug receivable in the opening to form an airtight seal between the plug and the surface of the part, the plug including first and second surfaces spaced by a thickness, a bore having a diameter and extending between the first and second surfaces and a vent hole extending between the first and second surfaces;
   a stem receivable in the bore along an axis and including:
      a cap having a sealing surface extending radially from an outer surface of the stem and overlapping the vent hole in the plug with the stem received in the bore; and
      a collar extending radially from the outer surface of the stem at a location spaced from the sealing surface of the stem by a distance and being configured to capture the plug between the collar and the cap, the distance being generally equal to the thickness between the first and second surfaces of the plug;
   wherein the collar is movable between a first position wherein the sealing surface is in engagement with the first surface of the plug so as to isolate an interior of the part and a second position wherein the collar compresses the second surface of the plug and the sealing surface is spaced from the first surface of the plug in response to the air pressure within the interior of the part.

9. The vent plug of claim 8 wherein the cap is interconnected to a first end of the stem.

10. The vent plug of claim 8 wherein the first surface of the plug includes a first portion, the bore and the vent hole intersecting the first portion of the first surface of the plug.

11. The vent plug of claim 10 wherein the thickness of the plug is a first thickness, the first thickness being the distance between the first portion of the first surface and the second surface of the plug.

12. The vent plug of claim 11 wherein the first surface of the plug includes a second portion extending radially outward from the first portion of the first surface of the plug, the second portion of the first surface and the second surface of the plug spaced by a second thickness less than the first thickness.

13. The vent plug of claim 10 wherein the plug includes a sidewall extending about an outer periphery, the sidewall including an outer surface engageable with the surface of the part and an inner surface projecting from the first surface of the plug.

14. The vent plug of claim 13 wherein:
the sidewall includes a terminal end axially spaced from the first surface of the plug; and
the sidewall including a flange extending radially outward from the terminal end.

15. A method for isolating a feature of a part having surface defining an opening in the part, the method comprising the steps of:
inserting a plug into the opening such that an airtight seal is formed between the plug and the surface of the part, the plug including first and second surfaces spaced by a thickness, a bore having a diameter and extending between the first and second surfaces and a vent hole extending between the first and second surfaces;
inserting a stem through the bore in the plug, the stem including:
a cap having a sealing surface extending radially from an outer surface of the stem and overlapping the vent hole in the plug; and
a collar extending radially from the outer surface of the stem at a location spaced from the sealing surface of the stem by a distance;
capturing the plug between the collar and the cap; and
moving the collar between a first position wherein the sealing surface is in engagement with the first surface of the plug and a second position wherein the collar compresses the second surface of the plug and the sealing surface is spaced from the first surface of the plug in response to the air pressure within the interior of the part.

16. The method of claim 15 wherein the distance between the collar and the sealing surface of the stem is generally equal to the thickness between the first and second surfaces of the plug.

17. The method of claim 15 wherein the cap is interconnected to a first end of the stem.

18. The method of claim 15 wherein:
the first surface of the plug includes a first portion, the bore and the vent hole intersecting the first portion of the first surface of the plug;
the thickness of the plug is a first thickness, the first thickness being the distance between the first portion of the first surface and the second surface of the plug; and
the first surface of the plug includes a second portion extending radially outward from the first portion of the first surface of the plug, the second portion of the first surface and the second surface of the plug spaced by a second thickness less than the first thickness.

19. The method of claim 15 wherein the plug includes a sidewall extending about an outer periphery, the sidewall including an outer surface engageable with the surface of the part and an inner surface projecting from the first surface of the plug.

20. The method of claim 19 wherein:
the sidewall includes a terminal end axially spaced from the first surface of the plug; and
the sidewall including a flange extending radially outward from the terminal end.

* * * * *